Figure 1:
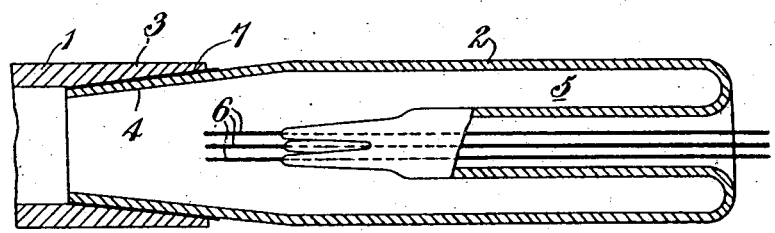

Aug. 16, 1927. 1,639,575
E. Y. ROBINSON
SEAL, JOINT, AND THE LIKE OF VACUUM CONTAINERS
Filed Aug. 20, 1923

Inventor
Ernest Yeoman Robinson
By
Attorney

Patented Aug. 16, 1927.

1,639,575

UNITED STATES PATENT OFFICE.

ERNEST YEOMAN ROBINSON, OF MANCHESTER, ENGLAND, ASSIGNOR TO METROPOLITAN-VICKERS ELECTRICAL COMPANY LIMITED, OF LONDON, ENGLAND, A BRITISH JOINT STOCK COMPANY.

SEAL, JOINT, AND THE LIKE OF VACUUM CONTAINERS.

Application filed August 20, 1923, Serial No. 658,409, and in Great Britain August 25, 1922.

This invention relates to improvements in seals, joints and the like of vacuum containers and provides a method of sealing together portions of containers or parts thereof such for example as the seals for the leading-in wires of electrical apparatus. The invention provides a method of sealing whereby portions of the container, seals, and the like which are sealed together may be separated at will without destruction of the apparatus. The container elements which are sealed together may be either metallic or non-metallic. The invention particularly provides for the case wherein one of the elements is non-metallic such for example as glass, silica and the like, and the other element is metallic. Furthermore the invention also particularly relates to the sealing in of the leading-in conductors and the like of vacuum electric tubes such for example as those employed in the production of X-rays and in the generation and rectification of alternating currents.

According to the invention the surfaces of the portions to be joined are formed of a metal which alloys with another metal or alloy which is itself liquid or plastic. Preferably mercury or an amalgam is employed. The container portions between which the joint is to be made are coated with such liquid or plastic metal or alloy and are applied to one another to form the joint or seal and the liquid or plastic metal or alloy forms the sealing medium.

In carrying out the invention the portions to be joined are first given a good mechanical fit preferably by grinding them into each other. The container or at least the surface of the portions thereof where they are in contact is constructed of a metal which alloys with or is wet by mercury, that is, a metal which is capable of forming an amalgam, preferably copper. If the container is not itself constructed of such metal, the surfaces effecting the joint may be joined for example by electro-deposition. The joint is effected by placing the container portions together with a small amount of mercury between the surfaces to act as a sealing medium. Preferably the surfaces are amalgamated before being placed in contact. The amount of mercury used should be reduced to a minimum consistent with obtaining the joint. If desired the joint as constructed according to this invention may be provided with an ordinary mercury seal as is a common practice. When one or more of the portions to be joined is constructed of non-metallic material then it may be given a coating of suitable metal for example by electro-deposition. When the portion of the container is constructed of glass then the metal which is deposited thereon may preferably be such that it is wet by glass and mercury and it may be fused into the surface of the glass.

In the preferred method of coating the glass with a metallic surface fused thereto for the purpose of this invention the glass is first coated with a deposit of metal such for instance as gold. Any substance which when heated will leave an adherent conducting layer on the glass may be used, but it is preferred to employ a noble metal owing to the fact that this does not oxidize on heating.

In one method the glass is coated with gold chloride by dipping it into an ethereal solution thereof or by painting it thereon. The gold chloride is then decomposed and gold is deposited. This may be effected a number of times, for example, ten times. The gold is then burnt into the glass. This may be effected a number of times for example, ten times. The gold may then be flushed with alcohol before immersion in a plating vat, though this is not necessary. Copper is then deposited on the glass using the gold as a base. The deposits should preferably be thin. The copper is fused on to the glass by heating it. This heating may take place in a reducing atmosphere, though this is not essential to the process. An air pressure may be created inside the tube while the burning-in processes are being carried out in order to prevent the tube collapsing, and if desired the tube may be blown out into a mould to retain for it the desired shape. However, when copper is being burnt into the glass it is found that the tube retains its shape if it is cylindrical or conical without the use of a mould. The copper thus burnt in can be trimmed of ragged edges, etc., by coating that part desired to be retained on the glass with wax and immersing the whole in acid such as nitric acid (1:1). The wax may then be removed by warming or by using a suitable solvent, or by plunging in concentrated sulphuric acid and the metal remaining on the tube is lightly pickled in readiness for immersion in the acid copper vat. Copper is then deposited on the glass until the desired thickness of deposit is obtained. If a very dense deposit is required the tube may be rotated at a high speed. The first burning in of the thin layer of copper and the trimming of the edges is not necessary but is found to be advisable.

The copper may be deposited directly on the burnt in gold, to the final thickness required and if desired deposition or at least thick deposition on the edges may be prevented by means of wax or otherwise. It is found that it is not essential to burn in the gold in the initial stage but it is desirable to do so unless the glass has a low melting point for instance, lead glass. Alternatively the gold may be deposited on the glass by other means, for example, by an electric discharge in a vacuum. In the latter case a base metal such as copper may be deposited instead of gold.

In another method the gold is affixed to the glass in the form of gold leaf and is then burnt in. To assist in fixing the gold leaf it may be held in position and fixed with an ethereal solution of gold chloride, borax or other suitable substance.

It is found that a perfect copper-to-glass seal may be produced by these means, the copper being in a non-oxidized condition. However, this is not essential as the copper may be oxidized to cuprous oxide at the surface of the glass and the oxide so formed dissolves in the glass in the burning-in processes. In one method the tube is coated with borax before the copper is deposited thereon, said borax accentuating the production of cuprous oxide. When gold leaf is used as the base for the deposition process it may be affixed to the glass by a solution of borax or borax may be applied first to the glass. The formation of cuprous oxide at the seal may be further increased by depositing the copper at a very rapid rate when the glass is first placed into the bath.

Figure 2:
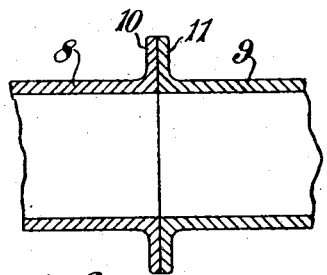
Figure 3:
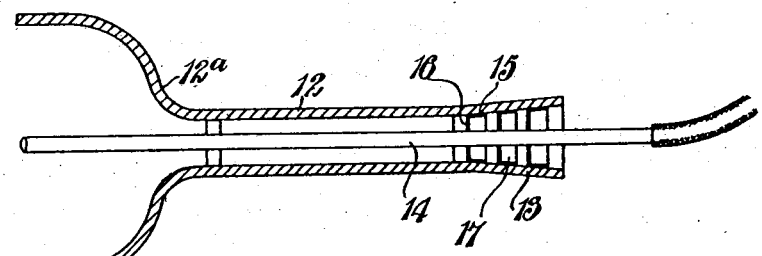

To enable the invention to be clearly understood it will now be described with reference to the accompanying drawings in which Fig. 1 is a sectional view of a portion of a vacuum electric device having a conical joint or seal in accordance with the invention and Fig. 2 is a sectional view of two portions of an evacuated device having a butt joint in accordance with the invention, Fig. 3 is a sectional view of a portion of a vacuum electric device having a lead-in conductor sealed therein in accordance with the invention.

In Fig. 1 of the drawings which only illustrates the part of the tube which is in the neighbourhood of the joint, one portion of the tube shown at 1 is metallic and the other portion 2 non-metallic. The portion 1 is preferably of copper or alternatively it may be of steel for example, and coated over the conical sealing surface 3 thereof with a metal such for example as copper. The non-metallic portion 2 consists of a tube of vitreous material such as glass having a conical portion 4 corresponding to the conical portion 3 of the portion 1. The portion 2 may carry for example, a re-entrant tube 5 and seal for the lead-in wires 6. The conical portion 4 is coated over its surface with a layer of copper 7 which is burnt into the glass as hereinbefore described. Before coating the glass with copper it is ground into the metal tube 1 so as to obtain an accurate mechanical fit. It is preferably ground in again after burning-in the copper surface. The two surfaces 3 and 7 are then individually amalgamated and the joint effected by placing the tube elements in position.

Referring to Fig. 2 which illustrates the joining of two copper tubes to form a vacuum joint, the two tubes 8 and 9 are provided with flanges 10 and 11 which are ground together and then amalgamated, the joint being effected by placing the flanges together in position.

If desired the metallic portion of the container may be constructed, at least in the neighbourhood of the seal, of a metal having the same coefficient of expansion as the glass employed for the other element of the seal and the surface which is touching the glass element with a copper surface may be coated with copper.

Alternatively, the portions of the container near the seal may be constructed of a plurality of metals having different coefficients of expansion, and may be so shaped that owing to the construction and to the difference in the coefficients of expansion, it has at the point where it is sealed to the glass a resultant coefficient of expansion equal to that of the glass.

When a seal or joint of the kind set forth is employed in a highly evacuated container such for example as one employed for "hard" vacuum electric tubes, the portion of the seal nearest to the interior of the container may be assembled "dry", that is, without the mercury sealing medium, in order to prevent the diffusion of mercury vapour into the apparatus.

The invention may be employed for the sealing of a leading-in conductor into a vacuum container. Referring to Fig. 3 which illustrates this application, the tube 12 is sealed at one end to the container at 12ᵃ and is provided at its other end with a flare or conical portion 13. The leading-in conductor is shown at 14 and passes through the tube 12. Mounted substantially coaxially with the leading-in conductor and arranged to make a good mechanical fit with the conical portion 13 of the tube 12 is a metallic tube 15, for example of copper, which is preferably short and thin walled. This tube is attached to the conductor 14 by a thin continuous support 16 so formed that it is elastic and flexible in order that it may expand and contract upon temperature changes. The tube 15 is sealed to the tube 12 in the manner hereinbefore described. A plurality of such seals may be arranged along the length of the conductor: three such seals are illustrated in Fig. 3. A cellular space such as 17 between adjacent seals may be filled with a liquid such as mercury, oil or the like, if desired. Alternatively these spaces may be evacuated by assembling the seals in vacuo. When the seal is intended for use with apparatus in which an extremely high vacuum is necessary then the seal or seals nearest the evacuated vessel may be assembled without the mercury sealing medium in order to prevent mercury vapour diffusing over into the evacuated vessel. During evacuation of the vessel the thin walled tube comprising this last seal may be distorted so that the space between the last and the last but one seals is open to the vessel during the evacuation period and so is thoroughly evacuated. It may consist wholly or in part of a magnetic material such as iron and distortion produced by means of a magnet applied externally to the tube. The space between the last seal and last but one may contain metals which absorb mercury vapour such for example as sodium, gold, copper or the like.

Alternatively, in place of mercury as sealing medium, a liquid or plastic alloy of mercury may be employed or other metals such for example as sodium, potassium and the like, or alloys of these, and the joining effected at the temperature at which these metals or alloys become plastic or liquid.

What I claim is:—

1. The method of forming a detachable gas-tight seal between two portions of an apparatus which is adapted to be evacuated, which consists in forming the jointing surfaces of a metal which alloys with an alloying medium which is itself flowable under a force applied thereto, applying such alloying medium to said jointing surfaces to alloy therewith, and then placing together the alloyed jointing surfaces to form the seal.

2. The method of forming a detachable gas-tight seal between two portions of an apparatus which is adapted to be evacuated, which consists in forming the jointing surfaces of a metal which alloys with a metallic alloying medium which is itself flowable at substantially ordinary temperature under applied force, applying such alloying medium to said jointing surfaces to form an alloy therewith, and then placing together the jointing surfaces thus prepared to form the seal.

3. The method of forming a gas-tight seal between two portions of an apparatus which is adapted to be evacuated, which consists in forming the jointing surfaces of a metal which alloys with a metallic medium which is itself liquid, applying said liquid metallic medium to said jointing surfaces to alloy therewith, and then placing together the jointing surfaces thus prepared.

4. The method of forming a gas-tight seal between two portions of an apparatus which is adapted to be evacuated, which consists in forming the jointing surfaces each of a metal which alloys with another metal which is itself liquid, applying said liquid metal to said jointing surfaces, and then placing together the jointing surfaces.

5. The method of forming a gas-tight seal between two portions of an apparatus which is adapted to be evacuated, which consists in forming the jointing surfaces each of a metal which alloys with mercury, applying mercury to said jointing surfaces, and then placing together the jointing surfaces.

6. The method of forming a gas-tight seal between two portions of an apparatus which is adapted to be evacuated, of which portion one at least is of glass, which consists in forming the jointing surfaces of copper, applying mercury to said jointing surfaces, and then placing together the jointing surfaces to form the seal.

7. The method of forming a quickly detachable gas-tight seal between the two portions of an apparatus which is adapted to be evacuated, of which portions one at least is of glass, which consists in forming the jointing surfaces of a metal which alloys with an alloying medium which is flowable under an applied force at a temperature which is less than the shock temperature above atmospheric temperature of the glass, applying said alloying medium in said flowable state to said jointing surfaces to alloy therewith, and then placing together the jointing surfaces while the alloying medium is in said flowable state.

8. The method of forming a quickly detachable gas-tight seal between two portions of an apparatus which is adapted to be evacuated, of which portions one at least is of glass, which consists in forming the jointing surfaces of a metal which alloys with another metal which is flowable under an applied force at a temperature which is less than the shock temperature above atmospheric temperature of the glass, applying said metal in said flowable state to said jointing surfaces, and then placing together the jointing surfaces so as to form the seal.

9. In an apparatus which is adapted to be evacuated, a gas-tight seal for joining portions thereof comprising cooperative jointing surfaces each composed of a metal which is alloyed with an alloying medium which is itself flowable under a force applied thereto.

10. In an apparatus which is adapted to be evacuated, a gas-tight seal between portions thereof comprising an alloying medium which is flowable under a force applied thereto, said medium being co-related to and between adjoining surfaces which consist respectively of a metal capable of alloying with said medium.

11. In an apparatus which is adapted to be evacuated, a gas-tight seal between portions thereof comprising a liquid alloying medium co-related to and between adjoining surfaces each of which consists of a metal capable of alloying with the said alloying medium.

12. In an apparatus which is adapted to be evacuated, a gas-tight seal between portions thereof comprising mercury co-related to and between adjoining surfaces each of which consists of a metal capable of alloying with mercury.

13. In an apparatus which is adapted to be evacuated, a gas-tight seal between portions thereof comprising jointing surfaces of copper which are alloyed with mercury.

14. In an apparatus which is adapted to be evacuated and comprises portions at least one of which is of glass, a gas-tight seal for joining said portions consisting of jointing surfaces of metal on the respective portions, and an alloying medium co-related to and between said surfaces, which medium is flowable under an applied force at a temperature less than the shock temperature above ordinary atmospheric temperature of glass and will alloy with the metal jointing surfaces on said portions.

15. A gas-tight seal for the portions of an apparatus which is adapted to be evacuated, one of said portions being of metal and the other portion of vitreous material, comprising metal jointing surfaces on said portions each of which is alloyed with an alloying medium which is itself flowable under a force applied thereto, the co-efficient of expansion of said metal portion adjacent to the seal, measured at the surface of the seal, being substantially equal to that of the vitreous portion.

16. A gas-tight seal for the portions of an apparatus which is adapted to be evacuated, comprising an alloying medium which is flowable under a force applied thereto and is co-related to and between adjoining conical surfaces of a metal capable of alloying with said alloying medium.

17. A gas-tight seal for the portions of an apparatus which is adapted to be evacuated, comprising an alloying medium which is flowable under a force applied thereto and is co-related to and between adjoining conical surfaces of a metal capable of alloying with said medium, the conical surface on one portion of the apparatus being connected to such portion by a flexible support.

In testimony whereof I have hereunto subscribed my name this eighth day of August, 1923.

ERNEST YEOMAN ROBINSON.